United States Patent [19]

Ashbrook et al.

[11] Patent Number: 4,645,606

[45] Date of Patent: Feb. 24, 1987

[54] MAGNETIC MOLECULAR AGGLOMERATE REDUCER AND METHOD

[76] Inventors: Clifford L. Ashbrook, Rte. 2, Box 439, Spicewood, Tex. 78669; Douglas B. Scarborough, Rte. 27, Box 124-A-3, San Antonio, Tex. 78238

[21] Appl. No.: 726,429

[22] Filed: Apr. 24, 1985

[51] Int. Cl.⁴ ............................ C02F 1/48; C02F 1/78; C02F 5/00

[52] U.S. Cl. ................................... 210/695; 210/696; 210/760; 210/221.2; 210/222; 210/512.2; 241/5; 241/39; 261/77; 261/DIG. 42; 366/173

[58] Field of Search .................. 55/2, 3, 100; 210/695, 210/696, 760, 764, 765, 195.1, 209, 220, 221.2, 222, 223, 257.1, 512.2; 241/5, 39; 366/173, 177, 273; 261/77, 121 R, DIG. 42

[56] References Cited

U.S. PATENT DOCUMENTS

| | | | |
|---|---|---|---|
| 2,825,464 | 3/1958 | Mack | 210/223 X |
| 3,228,878 | 1/1966 | Moody | 210/222 X |
| 3,511,776 | 5/1970 | Avampato | 210/222 X |
| 4,050,426 | 9/1977 | Sanderson | 210/222 X |
| 4,065,386 | 12/1977 | Rigby | 210/695 |
| 4,250,040 | 2/1981 | La Raus | 210/760 |
| 4,261,521 | 4/1981 | Ashbrook | 241/39 X |
| 4,265,746 | 5/1981 | Zimmerman, Sr. et al. | 210/222 X |
| 4,412,924 | 11/1983 | Feather | 210/760 X |
| 4,422,934 | 12/1983 | Debney et al. | 210/222 |
| 4,490,252 | 12/1984 | Brigante | 210/222 |
| 4,512,289 | 4/1985 | Collins | 210/222 X |
| 4,519,919 | 5/1985 | Whyte et al. | 210/695 |

Primary Examiner—Ivars Cintins
Assistant Examiner—W. Gary Jones
Attorney, Agent, or Firm—Cox & Smith Incorporated

[57] ABSTRACT

An apparatus and method of reducing agglomeration of fluids consisting of the vigorous agitation of the liquid by a double opposed vortex nozzle and the passing of the liquid through a magnetic field. One of the opposed nozzles may have ozone gas forced through it for treating sewage.

7 Claims, 5 Drawing Figures

MAGNETIC MOLECULAR AGGLOMERATE REDUCER AND METHOD

BACKGROUND OF THE INVENTION

The present invention relates to methods and devices for reducing the agglomeration of molecules in a fluid. More particularly, the present invention relates to methods and devices for reducing agglomeration in water and sewage, among others, for various uses.

The individual molecules which make up liquids, as well as all other substances, vary greatly in their relative size, complexity and properties. Individual molecules are capable of being "polar", which means they can carry positive and negative charges at different areas within the molecule. This polar propensity varies greatly from substance to substance and has a significant effect on the overall properties of the substance. In water and other liquids, the polarity of the individual molecules is believed to cause groupings of water molecules ("agglomeration") to form in units larger than individual molecules. Other theories for this phenomenon, explained more fully in Co-Applicant's earlier patent regarding this subject (U.S. Pat. No. 4,261,521, herein incorporated by reference), are that water has a network of joined polyhedral cages formed of H-bonded molecules, and containing within their cavities entrapped, but unbound, water molecules. Also, it has been theorized that water forms "flickering clusters" of molecules, which constantly change in size and structure.

Whatever the explanation for this phenomenon, it is known that vigorous agitation of liquids, particularly water, will cause a reduction in the agglomeration of the liquid and change its normal properties. Further, Applicants have noticed the same changes for all fluids, whether they be a gas, a liquid, or a solid suspended in a gas or liquid. Some of the changes in the physical properties of liquids, particularly water, are noted in Co-Applicant's prior U.S. Pat. No. 4,261,521 patent. It is believed that reduction of molecular agglomeration creates a relatively greater number of freed individual liquid molecules available to penetrate openings of pores in cells or plasma membranes and increases the solubility of liquids. Oxidation of substances is also increased. Further, it is known in the art that similar effects can be achieved by passing a fluid through a magnetic field. Changes in the pH, solubility and "hardness" of water have been noted when the fluid is magnetically affected.

Sewage is also comprised substantially of water. The treatment of sewage has attracted a variety of prior art methods and devices. One manner of treating sewage known in the art is to use ozone as an oxidizing agent in the treatment. Ozone has several advantages over chlorine (the traditional gas used for treating sewage) which make ozone an effective substitute. It is known that ozone kills a wider variety of bacteria and viruses in sewage than does chlorine, that ozone is generally safer to handle, that ozone is more effective at eliminating metals and chemicals in the sewage and that ozone removes and sterilizes sludge from sewage at a higher rate than chlorine. However, a drawback to the use of ozone has been the relatively slow reaction time and absorption rate when sewage is treated. Commercially available ozone generators suitable for sewage treatment are manufactured by Schmidding-Werke, in West Germany, among others.

Prior art of which Applicant is aware, although varying widely in its structure and use, are U.S. Pat. Nos. 4,265,746 (issued to Zimmerman, et al), 4,065,386 (issued to Rigby), 4,050,426 (issued to Sanderson), 3,511,776 (issued to Avampato), 3,228,878 (issued to Moody), 2,825,464 (issued to Mack).

The present invention combines the agitation means of Co-Applicant's prior patent with a means for magnetically affecting the fluid in the treatment of pure water and in the treatment of sewage by ozone. Further, it is contemplated that the design of Applicants' invention could be easily modified to detoxify chemical waste. Therefore, it is an object of the present invention to achieve a greater effect on the properties of fluids through reduction in agglomeration than that achieved by Co-Applicant's prior patent. Further, it is an object of the present invention to change the physical properties of relatively pure water. Further it is an object of the present invention to treat sewage. Further it is an object of the present invention to aid the treatment of sewage with an ozone based gas. Other objects of the invention will become apparent from the following materials.

SUMMARY OF THE INVENTION

An apparatus for reducing agglomeration of fluids, comprising means for forcing said fluid through said apparatus, said apparatus comprised of magnetic affecting means and agitating means, said agitating means operable to vigorously agitate said fluid to reduce the agglomeration in said fluid, and said magnetic affecting means mounted in close proximity to said agitating means. The agitating means is comprised of at least one inlet, a plurality of vortex apparatuses and an outlet, said vortex apparatuses operably connected to said inlet, and said outlet operably connected to said vortex apparatuses for removing the agitated and magnetically affected fluid from said agitation means. The vortex apparatuses are mounted in opposing relationship to each other, with each of said vortex apparatuses comprised of an accelerating chamber and a nozzle, and each nozzle oriented so that the exit of said nozzle substantially directs fluid towards fluid exiting another nozzle. Said vortex apparatuses may be substantially the same size or different sizes, with separate inlets for each vortex apparatus when said vortex apparatuses are different sizes. The apparatus may be further comprised of collecting means and connecting means for returning fluid from said collecting means to a pump, with said pump acting as the forcing means.

A method for reducing agglomeration of fluids comprising the steps of subjecting a fluid to a magnetic field and vigorously agitating said fluid. The first and second step may be performed relatively simultaneously. Said agitation may be achieved by pumping said fluid, diverting said fluid into at least two streams, and spraying said streams of fluid against each other through opposed nozzles, or said agitation may be achieved by pumping at least two types of fluid in separate streams to the device for agitating said fluids and spraying said separate streams against each other through opposed nozzles. The method may be further comprised of the steps of collecting said agitative fluid and pumping said agitative fluid back to the agitating means for repeating said first and second steps.

DESCRIPTION OF THE PREFERRED EMBODIMENT

The present invention is a modification of Co-Applicant's prior patent. The U.S. Pat. No. 4,261,521 patent discusses the structure and operation of the agitation means used in the present invention. The opposed vortex nozzle configuration is effective for reducing agglomeration to a certain extent, but Applicants have found that the addition of a magnetic affecting means has great effects on the properties of water and that a modified opposed vortex nozzle configuration can have applications in the treatment of sewage with ozone or the detoxification of chemical waste.

Figure 1:
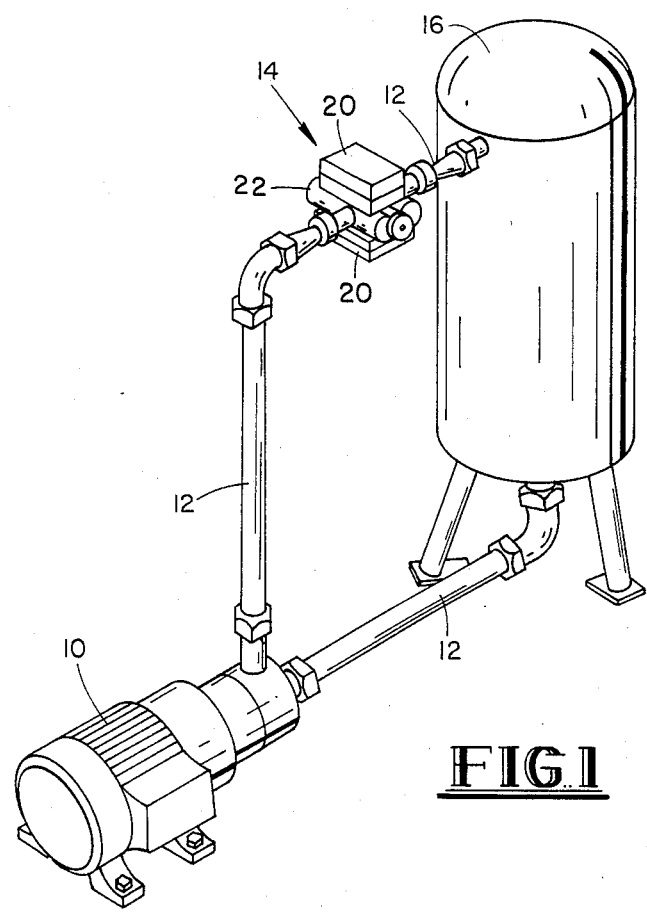
FIG. 1 is a perspective view of the first embodiment.

FIG. 1 shows the first embodiment as it is constructed in a closed-loop system for treating water. A pump 10 circulates the water through connecting means 12 to an agglomerate reducing means 14. After the reduction in agglomeration, the water is collected in a collecting means 16 and returns to the pump 10 by other connecting means 12.

Figure 2:
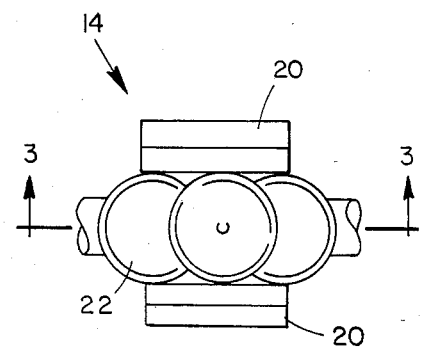
FIG. 2 is a side view of the first embodiment.
Figure 3:
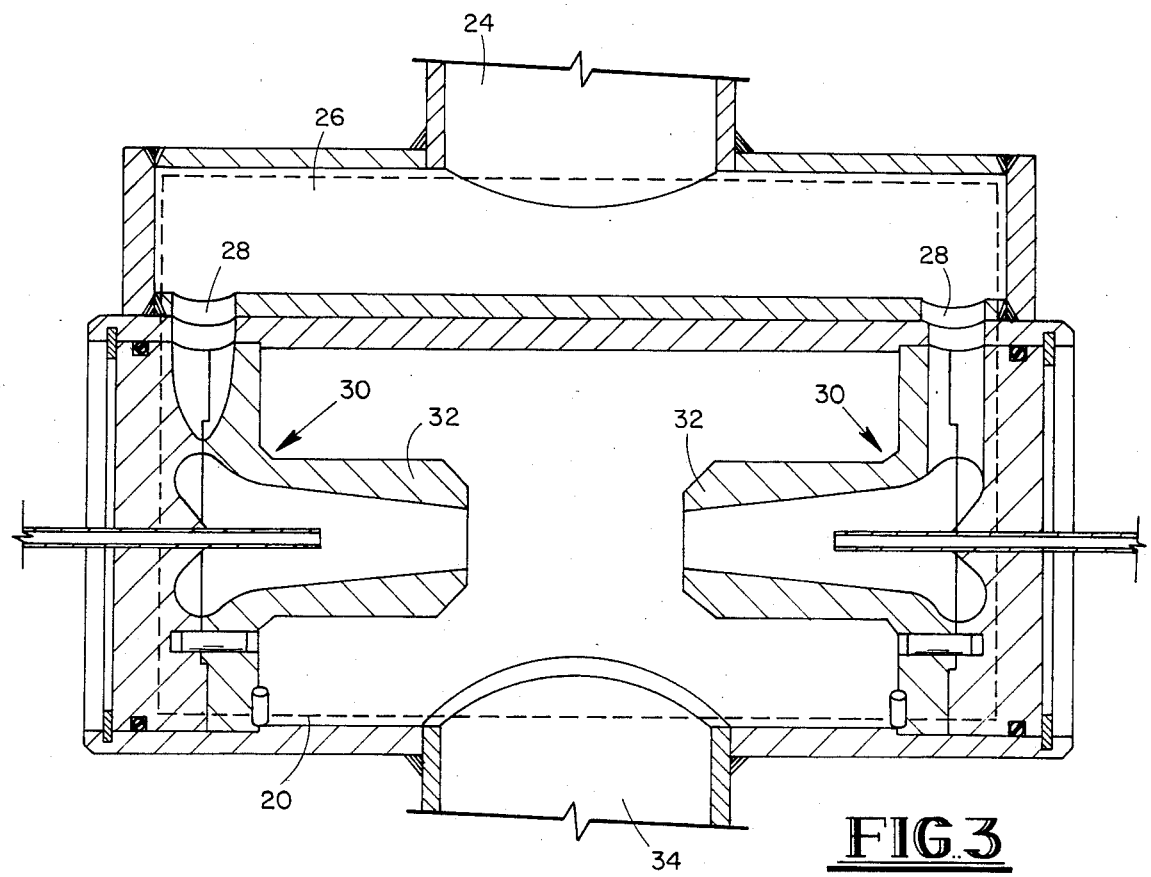
FIG. 3 is a cross-sectional view of the first embodiment as seen from lines 3—3 of FIG. 2.

The agglomerate reducing means 14 of the first embodiment is shown in more detail in FIGS. 2 and 3. The agglomerate reducing means 14 is comprised chiefly of two components, namely, a magnetic affecting means 20 and an agitating means 22. The magnetic affecting means 20 may be comprised of any magnet known in the art and may be attached to the agitation means 22 by any means known in the art, just so that the magnetic affecting means 20 is held in relatively close relation to the water at some point. Preferably, the hysteresis of the magnetic field is aligned with the flow of fluid, and that the magnetic affecting means 20 is placed at the agitating means 22. The present embodiment uses regular bar magnets attached to the agitating means 22 by brackets or tape (not shown) and magnetically affects the water simultaneous with the agitation.

The agitating means 22 is shown more clearly in FIG. 3. The agitating means 22 is identical to the one shown in Co-Applicant's prior patent, except that the water flows into the agitating means 22 from a single inlet 24 into a chamber 26. Water collects in the chamber 26 and is separated into two streams as it flows into the two vortex entrances 28. Once inside the opposed vortex apparatus 30, the water is accelerated through a spiral passageway (not shown) and exits the vortex nozzles 32 at a high rate of speed and is forced against an opposing stream of water exiting the other vortex nozzle 32. Other details on the agitating means 22 are well known in the art and disclosed fully in Co-Applicant's prior patent. Of course, design modifications involving more than two nozzles could easily be made. After agitation, the water exits the agitation means 22 through an exit 34. The magnetic affecting means 20 is shown in shadow lines.

Although not completely explained, it is clear that the addition of the magnetic affecting means 20 to the agglomerate reducing means 14 has surprising effects on the properties of pure water beyond that achieved by co-Applicant's prior patent. Using pure water which registered less than 0.1 (Si) mg/L in a direct aspiration flame atomic absorption method test using Perkin-Elmer model 5,000 unit, versus a controlled sample of deionized water, it was found that samples of the water treated by Applicants' invention had a boiling point as much as 5° C. lower than that of deionized water. Further, significant differences in surface tension, diffusion and transportation rate and clearing rate in butanol were found. Further, the treated water appears to retain its differing properties for several weeks.

The differences in diffusion and transportation rates have been found to make the treated water useful as a carrier in the manufacture of pharmaceuticals. Further, use in chemical separation processes and in chemical refining appears likely.

When regular tap water is treated by the invention of the first embodiment, the reduction in agglomeration apparently releases suspended silicates, as a great settling out of solids has been noted by Applicants. Thus, the invention is a compact and efficient device for softening water and removing minerals. The silicates collect in the collecting means 16 and can be periodically removed.

The principle of reduction of agglomeration has found a second use by the Applicants in the treatment of sewage. As stated, ozone is a common substituted for chlorine gas in the treatment of sewage. However, the gas used to treat sewage is not pure ozone, but a mixture of ozone, nitrogen and rare metal gases.

Applicants have found that the reduction in agglomeration of the liquids which comprise sewage allows treatment by ozone gas to be greatly speeded up. The traditional method of treating sewage with ozone gas is to bubble the gas through the sewage to allow it to be absorbed into the liquid. This contact time is normally thirty minutes in order to achieve full absorption and treatment by the ozone. However, the present invention allows the sewage to be treated instantly by ozone. In fact, Applicants have found that treatment of sewage by the invention of the second embodiment eliminates the need for storage tanks, which are used to collect sewage and hold it until the treatment process is complete.

Figure 4:
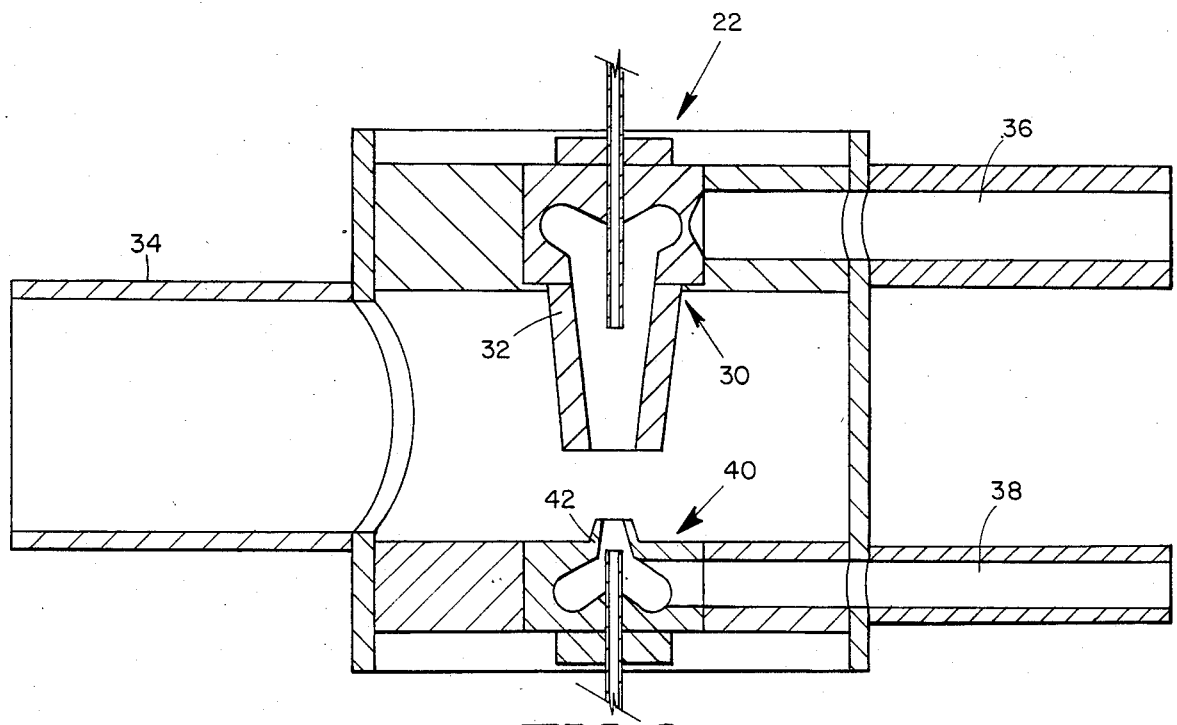
FIG. 4 is a cross-sectional view of the second embodiment as seen from lines 4—4 of FIG. 5.
Figure 5:
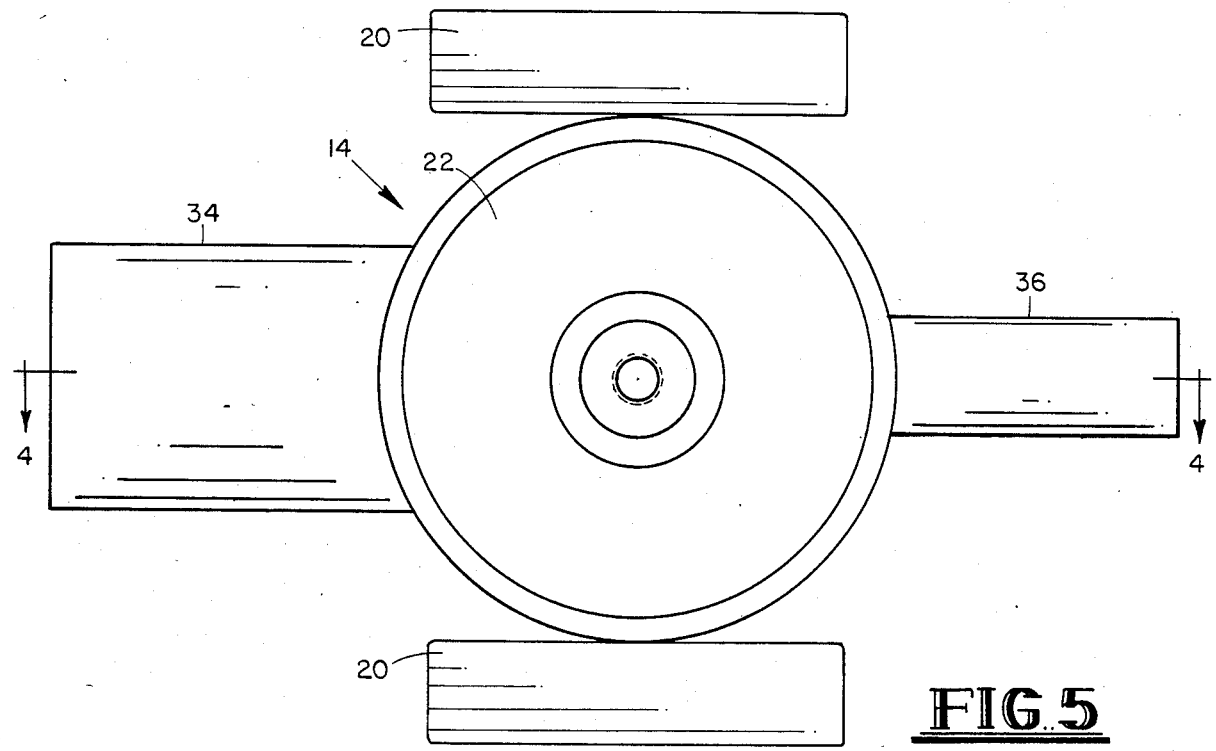
FIG. 5 is a side view of the second embodiment.

This improved treatment of sewage is achieved by the device shown in FIGS. 4 and 5. As stated, the second embodiment involves a modification of the first embodiment in which one of the vortex nozzles 32 and opposed vortex apparatus 30 is identical to those found in the first embodiment. Sewage is passed through this liquid vortex nozzle 32. As shown in FIG. 4, it is necessitated that the chamber 26 be eliminated, and the agitation means 22 is divided into separate inlet lines, with a sewage inlet line 36 and an ozone inlet line 38. The ozone inlet line 38 allows direct passage of the ozone gas mixture to a gas vortex apparatus 40. The gas vortex apparatus 40 is in all respects identical to the liquid vortex apparatus 30 except that the scale is reduced, for reasons to be discussed hereafter. Likewise, the gas vortex nozzle 42 is similar in structure to the liquid vortex nozzle 32, except that it is on a reduced scale. The reasons for the difference in scale between the liquid vortex apparatus 30 and gas vortex apparatus 40 stem from the differences in flow capabilities between the liquid and gas. Because the liquid and gas are accelerated so rapidly in the respective vortex apparatus, it is necessary that the opposed apparatuses 30 and 40 balance each other. In other words, if the sewage exited nozzle 32 with more kinetic energy than the ozone gas exited gas vortex nozzle 42, the sewage would overpower the exiting gas and the collision between the gas and the liquid would occur at the gas vortex nozzle 42 exit. Thus, it is required that Applicants' invention be designed so that the kinetic energies of the sewage and ozone, when exiting their respective nozzles, are equal so that the collision between the two substances takes place at a point approximately halfway between the liquid vortex nozzle 32 and gas vortex nozzle 42 exits. This balancing can be done by calculations well known in the art, given the diameters of the inlet pipes 36 and 38 and the pressures at which the sewage and gas are pumped to the agitating means 22. Again, an exit 34 collects the sewage and ozone gas to carry it away.

A side view of the agglomerate reducing means 14 of the second embodiment is shown in FIG. 5, with the agitating means 22 being situated between magnetic affecting means 20. In this side view, the sewage inlet 36 is shown, and the ozone gas inlet 38 is not shown. Again, the magnetic affecting means 20 can be attached to the agitating means 22 by any means known in the art, and can be comprised of bar magnets, electro-magnets, or other magnetic affecting means 20.

It is believed that the great reduction in the time required for the ozone to be absorbed into and treat the sewage is brought about by the reduction in agglomeration in the sewage, and possibly the ozone gas, also. As the sewage stream collides with the ozone gas stream, agglomeration in the various liquids making up sewage is reduced, and the greater number of freed individual molecules can more rapidly penetrate cell openings or pores in bacteria or viruses in the sewage, as well as other substances. Thus, the principle of the second embodiment has applications in other areas, such as the detoxification of chemical waste. The waste is pumped through one nozzle and the oxidizing or detoxifying substance is pumped through the other.

Although the invention has been described in the proceeding embodiments, numerous changes and variations are intended to fall within the scope of the present invention. The limitations of the scope of the invention are not intended to be defined by the description of the preferred embodiment, but rather by the following claims.

We claim:

1. A method for reducing agglomeration in fluids, comprising the steps of:
   pumping a fluid through a first vortex nozzle;
   simultaneously pumping a second fluid through a second vortex nozzle;
   agitating the fluids by spraying the fluid exiting the first vortex nozzle against the fluid exiting the second vortex nozzle;
   simultaneously magnetically affecting the fluids by a magnetic affecting means mounted in close proximity to the nozzles.

2. The method of claim 1, wherein:
   the fluid exiting said first vortex nozzle is ozone;
   the fluid exiting said second vortex nozzle is sewage.

3. The method of claim 1, wherein:
   both fluids are water.

4. An apparatus for reducing agglomeration in fluids, comprising:
   means for pumping fluids;
   said pumping means connected to a means for agitating said fluids;
   a magnetic affecting means mounted in close proximity to said agitating means for magnetically affecting said fluid as it is pumped through said agitating means;
   said agitating means further comprised of an inlet, a vortex apparatus connected with said inlet, and an outlet connected to said vortex apparatus;
   said inlet and said outlet connected to said pumping means;
   said vortex apparatus comprised of vortex nozzles mounted within means defining a chamber in opposed relationship to each other; and
   said nozzles oriented so as to direct the stream of fluid from one nozzle against a stream of fluid from another nozzle.

5. The apparatus of claim 4, wherein:
   said vortex nozzles are comprised of a first vortex nozzle and a second vortex nozzle.

6. The apparatus of claim 5, wherein:
   said first and second vortex nozzles are substantially the same size.

7. The apparatus of claim 5, wherein:
   said first vortex nozzle is smaller relative to said second vortex nozzle, said first vortex nozzle carrying a gaseous fluid and said second vortex nozzle carrying a liquid fluid;
   said first and second vortex nozzles provided with separate inlets connected to a first and second pumping means.

* * * * *